(12) United States Patent
Cramer, III

(10) Patent No.: US 6,650,691 B2
(45) Date of Patent: Nov. 18, 2003

(54) POWER CONTROL IN SPREAD SPECTRUM COMMUNICATIONS SYSTEMS

(75) Inventor: Joseph F. Cramer, III, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 12 days.

(21) Appl. No.: 10/074,860

(22) Filed: Feb. 12, 2002

(65) Prior Publication Data

US 2003/0152135 A1 Aug. 14, 2003

(51) Int. Cl.$^7$ ............................................. H04B 7/216
(52) U.S. Cl. ........................ 375/146; 375/297; 455/522
(58) Field of Search ................. 375/130, 146, 375/297, 141, 147; 370/335, 342; 455/69, 70, 522

(56) References Cited

U.S. PATENT DOCUMENTS

| | | | |
|---|---|---|---|
| 5,377,194 A | * 12/1994 | Calderbank | 370/524 |
| 6,285,663 B1 | * 9/2001 | Esmailzadeh | 370/311 |
| 6,418,321 B1 | * 7/2002 | Itoh | 455/522 |
| 6,442,155 B1 | * 8/2002 | Suk et al. | 370/342 |

OTHER PUBLICATIONS

3GPP TS 25.214 v4.3.0 (Dec. 2001), 3$^{rd}$ Generation Partnership Project; Technical Specification Group Radio Access Network; Physical layer procedures (FDD) (Release 4).

3GPP TS 25.133 v5.1.0 (Dec. 2001), 3$^{rd}$ Generation Partnership Project; Technical Specification Group Radio Access Network; Requirements for Support of Radio Resource Management (FDD) (Release 5).

* cited by examiner

*Primary Examiner*—Young T. Tse
(74) *Attorney, Agent, or Firm*—Brian M. Mancini

(57) ABSTRACT

A method for power control in spread spectrum communication systems includes a first step of providing multiplexed registers coupled to a control circuit and controlled by a TPC-derived control. One register containing an increased power control value and the other register a decreased power control value. A next step includes measuring a transmit power. A next step includes precalculating an increased and decreased power control value using the measured transmit power. Next steps includes comparing precalculated power control values to those previously stored in the registers, and writing only those changed values to their corresponding registers. A next step is receiving TPC information, followed by determining the requested power change from the TPC information, wherein if the information for the next slot is the same as for the current slot, writing the associated precalculated value to the next register to be selected. A last step is applying the value of the next selected register to the control circuit.

20 Claims, 5 Drawing Sheets

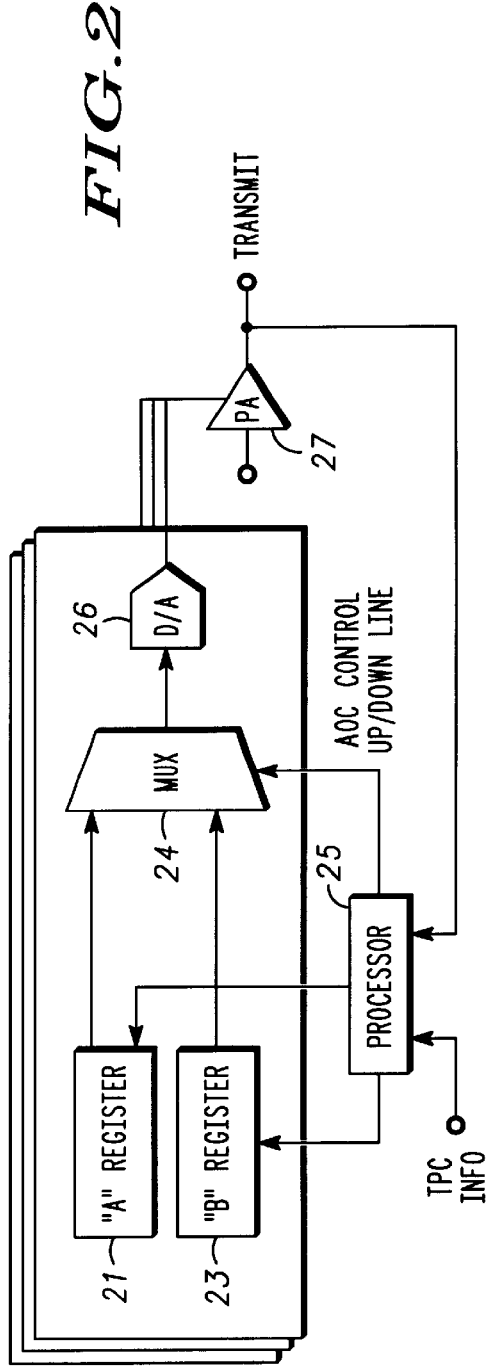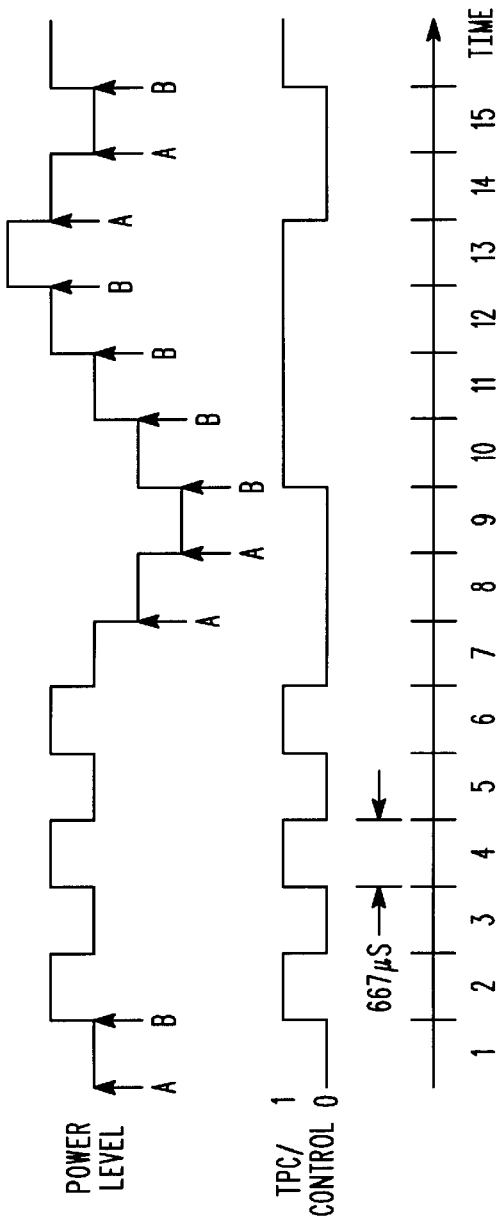

POWER CONTROL IN SPREAD SPECTRUM COMMUNICATIONS SYSTEMS

FIELD OF THE INVENTION

The present invention relates generally to wireless communications. More particularly, the invention is directed to power control in spread spectrum communication systems.

BACKGROUND OF THE INVENTION

The relative power used in each data signal transmitted in a spread spectrum communications systems require control in response to information transmitted by a base station and each remote unit. The primary reason for providing such control is to accommodate the many remote units that may be transmitting on the same frequency, such that all the transmitted signals are of the same approximate power so that none of the remote units are unusually disadvantaged. Unless the power being transmitted in the system is uniform among units, the signal quality may become unacceptable to those units at a lesser power, wherein a stronger transmitted signal will interferenee with a weaker signal. Thus, output power must be controlled to guarantee enough signal strength received at each unit to maintain good signal quality while minimizing the potential for interference.

Additionally, since a Code Division Multiple Access (CDMA), Wideband Code Division Multiple Access (WCDMA), and CDMA2000 wideband channel can be reused in every cell, self-interference caused by other users of the same call and interference caused by users in other cells represents a limiting factor to the capacity of the system. Moreover, the interference coming from the neighboring base stations may not fade with the signal from the active base station as would be the case for interference coming from the active base station. Due to fading and other channel impairments, maximum capacity is achieved when the signal-to-interference ratio (SIR) for every user is, on the average, at the minimum point needed to support "acceptable" channel performance. A remote unit in these situations may require additional signal power from the active base station to achieve adequate performance.

Communication systems are known to employ power control methods that control transmission energy of base stations and remote units. Power control in spread spectrum systems serves two main functions. First, because each remote unit's signal in a spread spectrum system is typically transmitted in the same frequency, a majority of the noise (i.e., inversely proportional to bit energy per noise density, Eb/No, defined as the ratio of signal energy per information-bit to noise power spectral density) associated with a received signal can be attributed to other remote units' transmissions. The magnitude of noise is directly related to the received signal power of each of the other remote units' transmissions. Thus, it is beneficial for a remote unit to transmit at a low power level. Secondly, it is desirable to dynamically adjust the power of all remote units in such a way that transmissions are received by the base station with approximately the same power level. Similarly, the remote unit can request modification of the base station transmitter power to maintain a suitable level.

Dynamic power control of a mobile station transmitter includes two elements: open loop estimation of transmit power by the mobile station, and closed loop correction of the errors in this estimate by the base station. In open loop power control, each mobile station estimates the total received power on the assigned spread spectrum frequency channel. Based on this measurement and a correction supplied by the base station, the mobile station's transmitted power is adjusted to match the estimated path loss, to arrive at the base station at a predetermined level. Closed loop corrections involve both the mobile station and the base station. After setting the initial level with the open loop estimate, the mobile station will begin its closed loop correction process, where the base station will send a power control bit to the mobile station in every transmission slot of a frame to tell the mobile to increase or decrease power. The step size of the power can change in 1 to 3 dB steps in each slot, depending on the communication system being used. In the same way, the mobile unit can send power control bits to the base station to request power modification.

For example, WCDMA base stations and mobile stations provide transmit power control (TPC) bits on the uplink and downlink dedicated physical control channels (UL DPCCH and DL DPCCH) in an effort to ensure that constant transmitter power is used between each. This system is described in $3^{rd}$ Generation Partnership Project; Technical Specification Group Radio Access Network; Physical layer procedures (FDD) (Release 4), 3GPP TS25.214 v4.3.0 (2001-12), which is hereby incorporated by reference. Unfortunately, the time for a mobile unit to receive TPC information from a base station, measure power level, calculate the power change, and prepare to uplink is limited to 133 microseconds per slot. Moreover, the mobile station may also be required to calculate power amplifier gain corrections, power amplifier bias corrections, and the like during this same time period, result in a peak in processing requirements that may not be met during this short period. This time can be further shortened by multi-path delays, conversion delays, propagation delays, receive and transmit lineup delays, serial transfer delays and DSP interrupt, task switch and data transfer delays. In practice, these items can reduce the time left over for power control processing to less than 50 microseconds. Similarly, the base station can have a processing peak between the time when the mobile station sends TPC information and when the base station downlinks.

What is needed is a way to reduce computation complexity during these time periods to reduce peak processing. In would also be of benefit to provide time for all other necessary corrections. It would also be of benefit if the above improvement could be provided in a simple hardware implementation with minimal software requirements.

BRIEF DESCRIPTION OF THE DRAWINGS

FIG. 2 illustrates a block diagram of hardware registers, in accordance with the present invention;

FIG. 6 illustrates a timing diagram of power control, in accordance with FIG. 5.

DETAILED DESCRIPTION OF THE PREFERRED EMBODIMENTS

The present invention allows for the independent timing control of up and down power control changes as well as a potential 50% reduction or more in average power control processing complexity. This is accomplished by doing peak processing calculations before they are presently required, during the time critical region between the reception of TPC signals and the actualization of the resulting transmitter power control changes. The improvement is provided using existing power control signaling with the addition of a simple hardware implementation of multiplexed dual registers that store the processing calculations.

The present invention allows for the pre-calculation and/ or pre-loading of both increasing and decreasing output power level changes via a number automatic output control (AOC) digital-to-analog voltage converters (DACs). At least one of the DACs controls transmit power. The other DACs can control power amplifier gain, power amplifier bias, and the like. In other words, if more calculations are required than can fit in the critical time window, both the up and down values can be pre-calculated such that only the value of the power control command and the corresponding state of a single control line need to be determined in the critical time window. Alternatively, the same hardware can be used to reduce the overall calculations needed for power control updates to the DACs within the critical time period, if the calculation are simple enough to be completed within that time. This invention reduces the peak processing requirements in the critical timing region between the reception of TPC commands and the actualization of transmitter output power control changes. This decoupling of critical region timing and power control calculation allows for a more advance power control scheme to be implemented, which as a result can be more accurate, flexible and power efficient. A single AOC Up/Down control line is used to select which of the two values should be applied to each of the DACs. This concept can also be extended to control register settings for control lines, control circuits, flip-flops, or other functions as well.

Figure 1:
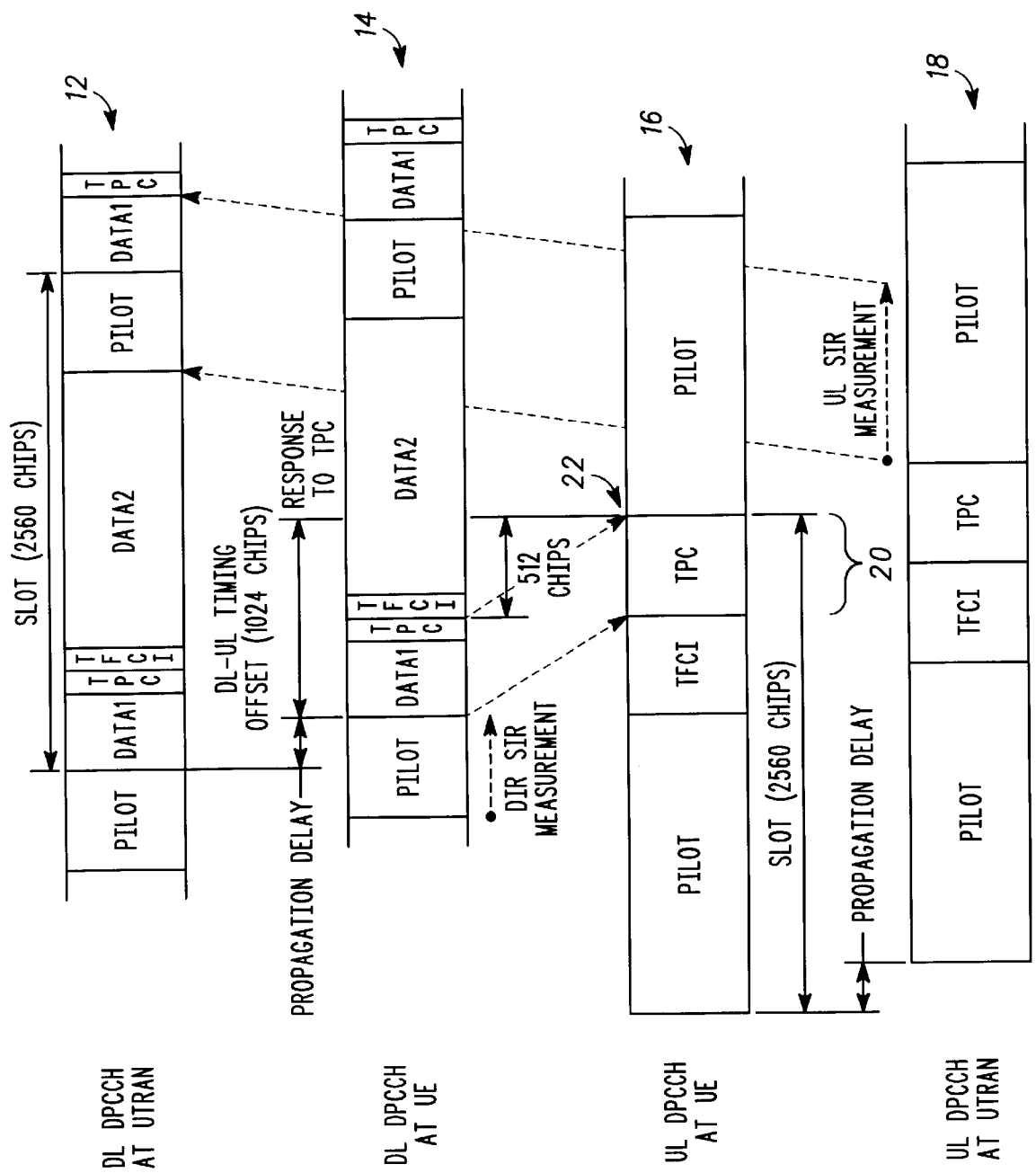
FIG. 1 illustrates a timing diagram showing the transfer of information in the uplink and downlink DPCCH in a WCDMA system.

In the 3GPP WCDMA system, for example, the relationship between the downlink physical channel slot formats and uplink physical channel slot formats is shown in FIG. 1. All measurements are shown at the antenna of the particular unit. The top bar graph 12 shows a simplified downlink signal in a dedicated physical control channel transmitted at a base station (UTRAN). In each slot of 2560 chips, a transmission is sent with TPC information (along with pilot signals, data signals, and transport format combination information, the nature of which can be disregarded for this discussion). Given a variable propagation delay, depending on the relative position of the mobile unit (UE) in a cell, the next bar graph 14 shows the same downlink information received at a mobile unit. In the third bar graph 16, the mobile unit uses the reception of the pilot signal to detect the power (as signal-to-information ratio or SIR) of the downlink signal from the base station. The detected power is used along with the TPC instructions from the base station to calculate the appropriate transmit power for the mobile unit before the next uplink 22. It is desired to keep the transmit power between the mobile unit and the base station at a constant SIR target, as is known in the art. The mobile unit also calculates the TPC information to request the base station to increase or decrease power. At present, all of these calculations (along with power amplifier gain, power amplifier bias, and the like) are required to be performed in a critical time period 20 between the receipt of the TPC information from the downlink and the uplink 22. As shown, the uplink 22 is delayed by 1024 chips from the downlink to account for the maximum cell radius that may be encountered. This results in a theoretical critical time limit of 133 microseconds (512 chips), which can be further shortened by multi-path delays, conversion delays, propagation delays, receive and transmit lineup delays, serial transfer delays and DSP interrupts, task switching and data transfer delays, to less than 50 microseconds. In the bottom bar graph 18, again delayed by the propagation delay between the base station and the mobile unit, the base station receives the TPC information from the mobile unit, along with the measured SIR from the mobile unit, to recalculate an appropriate power level for the next downlink. This cycle of power control repeats this way for every slot, using open-loop or closed-loop power control as described previously.

The base station has more leeway in power control as it can ignore the TPC request for power change. The SIR measurement periods are not specified for either base station or the mobile unit. In addition, the delay from the uplink TPC command reception to the power change timing is not specified for base station. Moreover, the TPC information can be sent over one or three slots depending if there is soft handoff during communications. If more than one set of TPC information is provided, such as during soft handoff, a decision on a control signal is made by voting, or performing post processing, to determine whether an increase or decrease in power is called for. In all cases, spread spectrum communication systems define fixed physical layer events such as receive slots, transmit slots, and the like with respect to the uplink and downlink timing. Mobile units and base stations have programmed layer 1 timers that are called to properly affect these actions.

The critical time period 20 is defined by the time between the end of the reception of the downlink TPC data and the beginning of the uplink slot, as can not be expanded. Within this time the TPC values, which signal a control change in an up or down direction, are to be processed and used to with the detected power to effectuate the appropriate control such that the actual output power changes at the antenna nominally at the uplink slot boundary 22. The TPC commands give an indication in which direction the power control change should be made independent of the size of the power control change. The power control step size is either known a priori or is signaled via higher layer messaging. The present invention takes advantage of this independence to pre-calculate the up and down power step calculation, using the measured SIR from the pilot signals, before receiving the TPC information. These two calculations for an up power step and a down power step are stored in separate registers. Then, given the TPC information for an up or down correction, the associated register can be selected without further calculation. Fortunately, the rate of change of the power control is limited. Therefore, the specified power control step size can be considered constant relative to the TPC signaling rate of 1500 Hz. The actual step size can then be accurately pre-calculated as a function of the actual power detector readings (SIR).

FIG. 2 shows a block diagram of the hardware registers described above. Two or more registers can be used. The registers are included in a communication device such as a cellular telephone or corresponding base station. The A and B registers 21,23 are pre-loaded with the values of for increased transmit power and decreased transmit power for a power amplifier 27. This is accomplished by an existing processor 25 in the communication device. Note that the either register can contain either the up or down values. The registers 21,23 are multiplexed through a multiplexer 24 that select one or the other of the registers depending on an AOC control up/down line, which is a simple one-bit control supplied by the processor 25. In its simplest form, the transmitted TPC information is a single bit, "0" to command a transmit power decrease or "1" to command a transmit power increase. If more than two registers are used, then more select bits are needed. These bits can be directly used as the AOC up/down control line. The appropriate increased transmit power or decreased transmit power value is then applied to a control circuits 26, such as a DAC, flip-flop, and the like, or simple control line for coupling with the power amplifier. Similarly, the AOC control line can also be use multiplex other sets of registers to apply incremental or decremental signals to associated control circuits for power amplifier gain correction, power amplifier bias correction, and the like. It should also be noted the use of the above described registers are not limited to pre-calculations, but can also be used to store simple calculations that can be performed during the allotted critical time period (20 in FIG. 1). The above actions are controlled by an operating system in the processor of the communication device.

Figure 3:
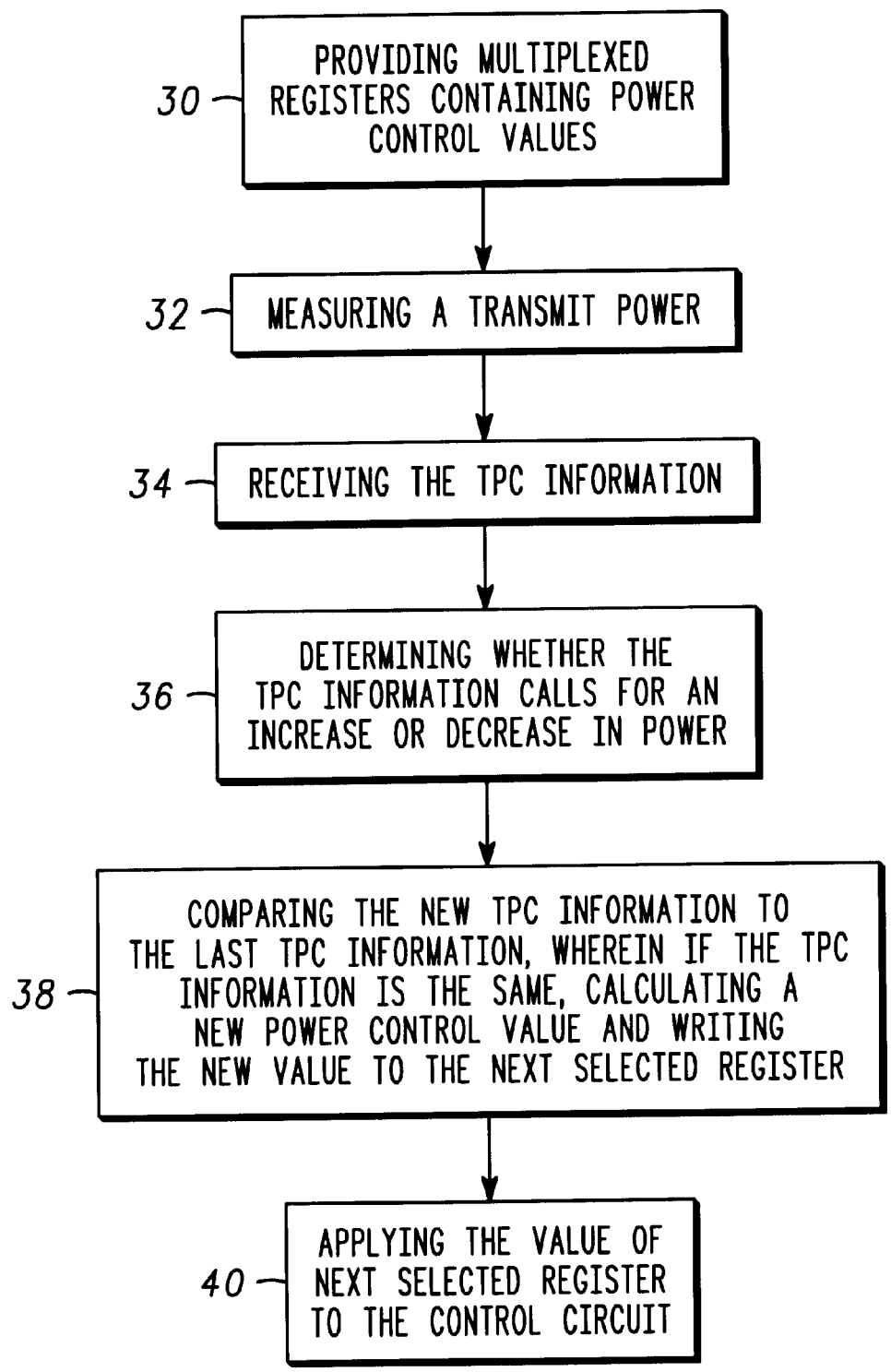
FIG. 3 illustrates a flow chart of a first embodiment of power control, in accordance with the present invention.

The present invention provides a first embodiment of a method for power control in spread spectrum communication systems, as shown in FIG. 3. A preliminary step 30 of the method is providing a plurality of multiplexed registers coupled to a control circuit. Preferably, there are dual registers and the control circuit is an automatic output control digital-to-analog-converter (AOC DAC). The multiplexed registers are controlled by an AOC control signal on a control line. The registers containing power control values that can be an increased power control level and a decreased power control level, or other settings. Preferably, the control circuit is an automatic output control (AOC) DAC and the control signal is an AOC control line. The following steps are controlled by the processor of the communication device.

A next step 32 of the method includes measuring a transmit power of the received signal after an uplink transmit slot. Preferably, this is done by a sequence manager reading a transmit power detector ADC every slot during a pilot signal. In operation, the power detector is coupled with a serial peripheral interface (SPI) to a main processor. The sequence manager uses the layer one timer to trigger a SPI read of the latched power detector ADC value in every slot during transmission of pilot signals.

A next step 34 includes receiving the TPC information from the communication system. Upon reception of the TPC symbols (possibly from multiple base stations in soft handover), a direction of TPC command as "up" or "down" is determined 36 to program the corresponding AOC I/O control line to reflect the TPC command state. If multiple TPC symbols are present from soft handover, deciding on a control signal is done by voting, or performing post processing, to determine the final up or down state.

A next step 38 includes comparing the new TPC information to the last TPC information. If the TPC information for the next slot is the same as the TPC information for the last slot (i.e., does not change), then a new power calculation must be made. In this case, a next substep 40 is calculating a new power control value, followed by a substep 42 of writing the new value to the next selected register via SPI. Preferably, the A and B registers are called alternately at every slot, as controlled by an alternating control line, so the new value is written into the next selected register. Note that in this embodiment the A and B registers can contain either of a high and lower value and are not dedicated to one value or the other. The calculating substep 40 uses the transmit power detector value, current power control step size, TPC information and other parameters based on power amplifier gain, power amplifier bias, and the like, as input into a power control calculation algorithm. Preferably, this step includes calculating the appropriate increased or decreased power value for the power control, and any of the other incremental DACs (e.g. power amplifier gain, power amplifier bias, etc.) that would need to change from the last slot's calculations.

Just before the next pilot signal is transmitted (at the active edge of the transmitter ramp up or slot), the sequence manager performs the next step 40 of applying the next selected register to the control circuit (DAC) to adjust transmit power, by latching the AOC DACs with the control line selected register value. Preferably, this is done at a preprogrammed delay time relative to this active edge to allow power stabilization. These steps are repeated for each slot.

Figure 4:
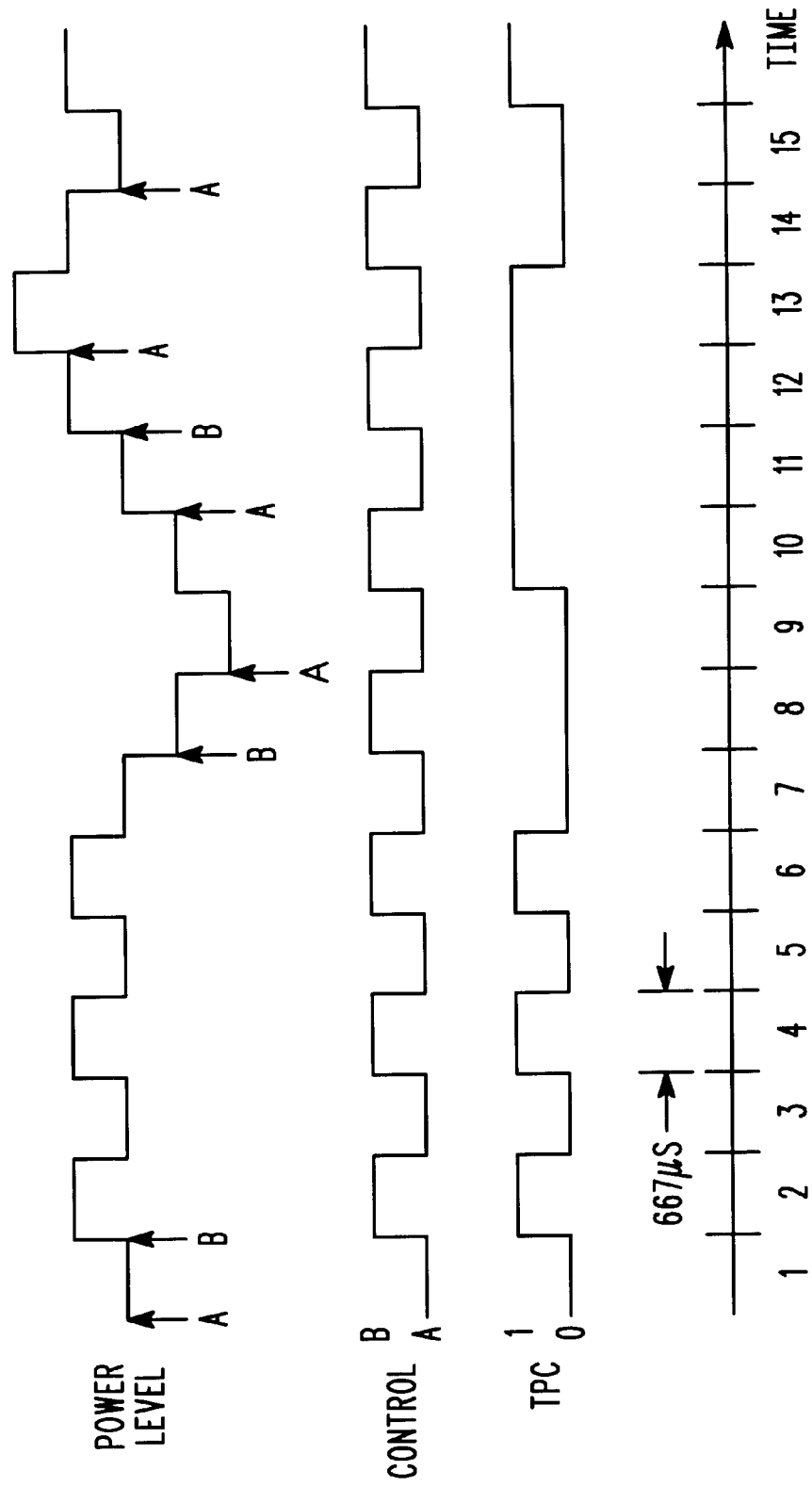
FIG. 4 illustrates a timing diagram of power control, in accordance with FIG. 3.

FIG. 4 shows an example series of power control steps shown with indications of register updates and AOC up/down control states, in accordance with the method of FIG. 3. The bottom graph represents each 667 microsecond slot. The next graph up shows a simulation of transmitted TBC information bits that are used to drive power up or down. The second graph from the top show the alternating AOC control line, which calls the A and B registers alternately at every slot. At the beginning, signal levels are relatively stable. Therefore, the TBC control bits vacillate between commanding an increase (1) and decrease (0) of power levels. After this period, the TBC bits command a power decrease for three slots (7–9), followed by a power increase for four slots (10–13), followed by a power decrease of two slots (14–15), etc. This can be considered a typical string of TBC commands.

The top graph shows the power level and the arrows show where the A and B registers must be reloaded with updated calculations of power levels. This occurs during the critical time period between receipt of the TPC information and the next uplink. The "A" and "B" arrow indications represent an update to that register. In this embodiment, either of the A or B registers can hold the higher or lower calculated power level. At the start, the TBC bit is 0 which commands a lower power level before the next uplink, necessitating the calculation and storage of this lower power level in the A register. At the next slot, the TBC bit is 1 which commands a higher power level before the next uplink, necessitating the calculation and storage of this higher power level in the B register. For the next five slots (3–7), the signal is in a pseudo steady-state where the power control commands oscillate between up and down, the two registers hold the corresponding pseudo steady-state DAC values and the up/down control line would simply alternate states in each slot with out requiring further calculations. At slot 8, the TBC bit is 0, the same as for slot 7, calling for another lowering of power after the lowering in slot 7. This requires a recalculation of power and writing this value to the next selected register (B in this case). Slot 9 also calls for lowering power, so a recalculation of power is made and written into the next selected register (A in this case). At slot 10, the power reverses, and the correct value is already in register B from slot 8, so no calculation is needed. (The same reasoning holds for the opposite case of slots 13 and 14) In slots 11–13 the power is continually ramped up which requires a new calculation in alternating registers in each of those slots. As can be seen, where there is a continual ramp up or ramp down of power, and after an initial slot, recalculations must be done at every step, as in the prior art. However, in slots where signal levels are relatively constant (within a specified power control step size) which occurs quite often, the present invention eliminates the need for constant recalculations during the critical period. It is envisioned that this improvement can reduce calculations by about 50% or more, reducing peak processing loads on the processor.

It is possible in other scenarios to allow the A/B register select line to remain at the A or B setting such that the output power remains constant (no significant change in transmit power or less than one step size). In that case the control line would not strictly alternate every slot. This can happen in alternate power control modes (referred to as power control mode 2 in TS 25.214) where the output power is only required to change every 3 or 5 slots.

Figure 5:
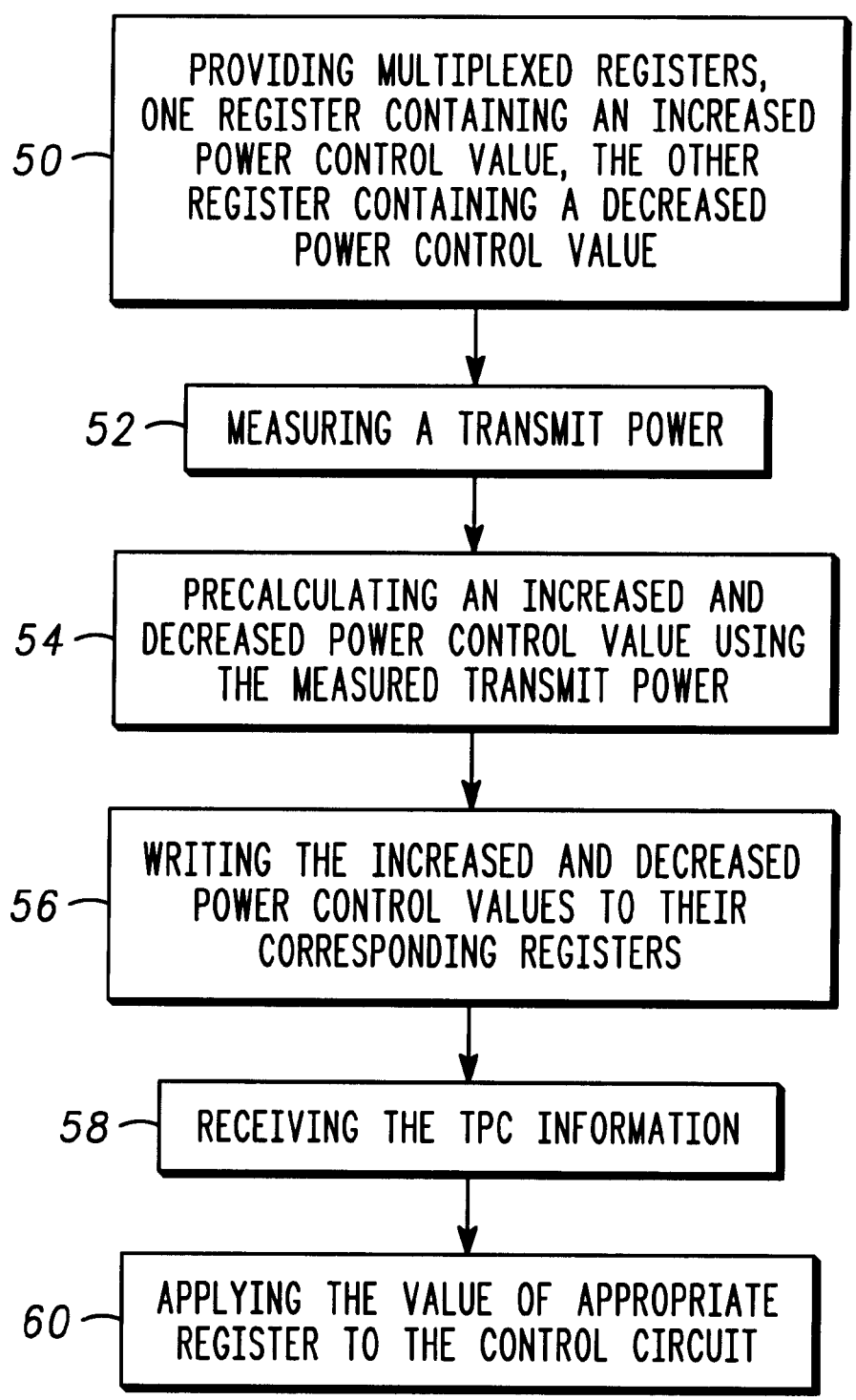
FIG. 5 illustrates a flow chart of a preferred embodiment of power control, in accordance with the present invention.

The present invention also provides a preferred embodiment of a method for power control in spread spectrum communication systems, as shown in FIG. 5. A preliminary step 50 of the method is providing a plurality of multiplexed registers coupled to a control circuit. Preferably, there are dual registers and the control circuit is an automatic output control digital-to-analog-converter (AOC DAC). The multiplexed dual register is controlled by an AOC control signal derived from transmit power control (TPC) information, one register containing an increased power control value, the other register containing a decreased power control value. Preferably, the control circuit is an automatic output control (AOC) DAC and the control signal is an AOC control line. The following steps are controlled by the processor of the communication device.

A next step 52 of the method includes measuring a transmit power of the received signal after an uplink transmit slot of the communication system. Preferably, this is done by a sequence manager reading a transmit power detector ADC every slot at a fixed time after the uplink transmit slot. The delay provided by the fixed time from the uplink slot to the read of the power detector will be calibrated to take into account the power detector low pass filtering time constant. In other words, the fixed time allows the power reading to settle. In operation, the power detector is coupled with a serial peripheral interface (SPI) to a main processor. Layer 1 control software triggers a timer for a SPI read of the latched power detector ADC value in every slot just after the ADC reading has been latched.

A next step 54 includes precalculating an increased and a decreased power control value using the transmit power detector value, current power control step size, and other parameters based on power amplifier gain, power amplifier bias, and the like, as input into a power control calculation algorithm. Preferably, this step includes pre-calculating the appropriate increased and decreased value for the power control, and any of the other DACs (e.g. power amplifier gain, power amplifier bias, etc.) that would need to change from the last slot's calculations.

A next step 56 includes writing the increased and decreased power control values to their corresponding registers. Preferably, before this step an additional step is performed of comparing the increased and a decreased power control values from the calculating step to those previously stored in the dual registers. This takes into account whether an equivalent value is already in one of the two up/down registers from previous calculations. If so, the new calculation value need not be restored over the same value, saving processor time. If the comparing step is used then the writing step 56 includes writing only those power control values that have changed to their corresponding registers AOC DAC registers via SPI. In this embodiment, each register is dedicated to always hold either the increased or decreased power control value. For example, register A can always hold the decreased power control value and register B can always hold the increased power control value.

A next step 58 includes receiving the TPC information from the communication system. If multiple TPC symbols are present from soft handover, a decision on a control signal is made by voting, or performing post processing, to determine the final up or down command state.

Just before the next pilot signal is transmitted (at the active edge of the transmitter ramp up or slot), the sequence manager performs the next step 60 of applying the value of the next selected register to adjust transmit power, by latching the AOC DACs with the AOC control line. Preferably, this is done at a pre-programmed delay time relative to this active edge to allow power stabilization. These steps are repeated for each slot.

FIG. 6 shows an example series of power control steps shown with indications of control register updates and AOC up/down states, in accordance with the method of FIG. 5. The bottom graph represents each 667 microsecond slot. The next graph up shows a simulation of transmitted TBC control bits which are used to command power level by the control line. At the beginning, signal levels are relatively stable. Therefore, the TBC control bits vacillate between commanding as increase (1) and decrease (0) of power levels. After this period, the TBC bits command a power decrease for three slots (7–9), followed by a power increase for four slots (10–13), followed by a power decrease of two slots (14–15), etc. This can be considered a typical string of TBC commands.

The top graph shows the power level and the arrows show which of the A and B registers have been reloaded with updated precalculations of power levels. Preferably, both registers are preloaded when necessary, and these arrow indicators are different from the previous embodiment in that they are loaded before the critical time between when the TPC information is received and the uplink is made. In this embodiment, the registers are dedicated to hold either the higher or lower calculated power level. For example, register A holds the lower power, and B holds the higher power. At the start, the TBC bit is 0 which commands a lower power level before the next uplink, which calls the pre-calculated lower power level in the A register. At the next slot, the TBC bit is 1 which commands a higher power level before the next uplink, which calls the precalculated higher power level in the B register. For the next five slots (3–7), the signal is in a pseudo steady-state where the power control commands oscillate between up and down, the plurality of registers hold the corresponding pseudo steady-state DAC values and the up/down control line would simply alternate states in each slot with out requiring further calculations or storage. At slots 8 and 9, the TBC bit is 0 calling for another lower of power after the previous lowering in earlier slots (7 and 8). At slot 10 the TPC reverses, with the appropriate higher power level already stored in selected register B. After this, the power is continually ramped up which requires a pre-calculation for register B, although register A is also pre-calculated (slots 11–13). However, slot 14 again reverses TPC which requires no pre-load in registers. As can be seen, in slots where signal levels are relatively constant (within 1 db) which occurs quite often, the present invention eliminates the need for constant calculations. In a non steady-state case a given command indicates to increase or decrease the transmit power with a 50% chance that the value at time n+1 will be the same as the value used at time n−1 which is still contained in one of the two registers. It is envisioned that this improvement can reduce calculations by about 50%. Further, in this embodiment, these calculations are done at a non-critical time avoiding peak processing problems.

One can see from this example that the rate to update registers is reduced from the prior art case of recalculating power at every slot to a rate approximately 50% less than that or better, reducing the calculation update rate from 1500 Hz to 750 Hz, ignoring slowly changing contributors.

While the foregoing described embodiments have been set forth above, it will be appreciated to one skilled in the art that the invention described has applications beyond the described embodiments. Accordingly, it is intended that the scope of the invention including such alternatives, modifications, and variations contemplated shall be defined by the appended claims.

What is claimed is:

1. A method for power control in spread spectrum communication systems, the method comprising the steps of:
   providing two or more multiplexed registers coupled to a control circuit, the multiplexed registers controlled by a control signal derived from transmit power control (TPC) information, one register containing an increased power control value, the other register containing a decreased power control value;
   measuring a transmit power after an uplink transmit slot;
   precalculating the increased power control value and the decreased power control value before receiving the TPC information using the measured transmit power;
   writing the increased power control value and the decreased power control value to their corresponding registers;
   receiving the TPC information; and
   applying the control signal corresponding to the TPC information to a multiplexer of the registers to select the value of appropriate register to the control circuit.

2. The method of claim 1, wherein the measuring step occurs at every slot a fixed delay time after the uplink transmit slot.

3. The method of claim 1, wherein the receiving step includes deciding on the control signal where multiple TPC signals are present.

4. The method of claim 1, wherein all the steps are repeated during each timing slot.

5. The method of claim 1, wherein before the writing step further comprising the step of comparing the increased and decreased power control values to the power control values previously stored in the registers, and wherein the writing step includes writing only those increased and decreased power control values that have changed to their corresponding registers.

6. The method of claim 1, wherein the applying step includes providing an automatic output control (AOC) signal to the multiplexer to select the power control values between the registers, the AOC signal for selecting the register having the increased power control value if the TPC information requests an increase in power, and the AOC signal for selecting the register having the decreased power control value if the TPC information requests a decrease in power.

7. The method of claim 6, wherein the providing step provides a one-bit AOC signal indicating either a power up or power down request.

8. A method for power control in spread spectrum communication systems, the method comprising the steps of:
   providing multiplexed dual registers coupled to a control circuit, the multiplexed dual registers controlled by a control signal derived from transmit power control (TPC) information, one register containing an increased power control value, the other register containing a decreased power control value;
   measuring a transmit power a fixed delay time after an uplink transmit slot;
   precalculating the increased power control value and the decreased power control value before receiving the TPC information using the measured transmit power;
   comparing the increased and decreased power control values to the power control values previously stored in the dual registers;
   writing only those increased and decreased power control values that have changed to their corresponding registers;
   receiving the TPC information;
   determining the requested power control change direction from the TPC information, wherein if the TPC information for the next slot is the same as for the current slot, writing the associated precalculated power control value being requested by the TPC information to the next register to be selected;
   applying the value of the next selected register to the control circuit to adjust transmit power; and
   repeating the steps of measuring through applying for each timing slot of the communication systems.

9. The method of claim 8, wherein the receiving step includes deciding on the control signal where multiple TPC signals are present.

10. The method of claim 8, wherein in the providing step each register is dedicated to contain either the increased or decreased power control value.

11. The method of claim 8, wherein the applying step includes providing an automatic output control (AOC) signal to a multiplexer to select the power control values between the dual registers, the AOC signal for selecting the register having the increased power control value if the TPC information requests an increase in power, and the AOC signal for selecting the register having the decreased power control value if the TPC information requests a decrease in power.

12. The method of claim 11, wherein the providing step provides a one-bit AOC signal indicating either a power up or power down request.

13. The method of claim 8, wherein the same steps are performed for other control circuit processes selected from the group consisting of power amplifier gain correction and power amplifier bias correction.

14. An apparatus to control power in a spread spectrum communication system, the apparatus comprising:
   a plurality of hardware registers, the registers containing a precalculated increased power control value and a precalculated decreased power control value;
   a multiplexer coupled to the hardware registers, the multiplexer controlled by a control line to switchably select one of the registers;
   a control circuit coupled to the multiplexer,
   a processor for providing a control signal to the control line, the processor measures a transmit power after an uplink transmit slot of the communication system, precalculates the increased power control value and the decreased power control value before receiving transmit power control (TPC) information using a measured transmit power, writes the increased and decreased power control values to their corresponding registers, receives the TPC information from the communication system, and applies the control signal corresponding to the TPC information to the multiplexer to select the value of the appropriate register to the control circuit.

15. The apparatus of claim 14, further comprising a power amplifier to drive the transmit power coupled to a digital-to-analog converter that is coupled to the multiplexer.

16. The apparatus of claim 14, wherein the processor measures the transmit power for every slot at a fixed delay time after the uplink transmit slot.

17. The apparatus of claim 14, wherein if multiple TPC signals are present, the processor decides on the control signal.

18. The apparatus of claim 14, wherein the processor compares the increased and decreased power control values to the power control values previously stored in the registers, and writes only those increased and decreased power control values that have changed to their corresponding registers.

19. The apparatus of claim 14, wherein the control signal is an automatic output control (AOC) signal that selects the register having the increased power control value if the TPC information requests an increase in power, and selects the register having the decreased power control value if the TPC information requests a decrease in power.

20. The apparatus of claim 19, wherein the control signal is a one-bit AOC signal indicating either a power up or power down request.

* * * * *